United States Patent
Lee et al.

(10) Patent No.: US 6,872,791 B1
(45) Date of Patent: Mar. 29, 2005

(54) POLYOLEFIN NANO-COMPOSITE

(75) Inventors: Yoon Hwan Lee, Taejeon (KR); Won Beum Jung, Taejeon (KR); Young Soo Ko, Taejeon (KR); Ki Su Ro, Taejeon (KR)

(73) Assignee: Samsung Atofina Co. Ltd., Chungnam (KR)

( * ) Notice: Subject to any disclaimer, the term of this patent is extended or adjusted under 35 U.S.C. 154(b) by 0 days.

(21) Appl. No.: 10/451,454

(22) PCT Filed: Dec. 22, 2001

(86) PCT No.: PCT/KR01/02244

§ 371 (c)(1),
(2), (4) Date: Nov. 19, 2003

(87) PCT Pub. No.: WO02/051889

PCT Pub. Date: Jul. 4, 2002

(30) Foreign Application Priority Data

Dec. 22, 2000 (KR) ........................................ 2000-80118

(51) Int. Cl.$^7$ ................................................. C08F 4/42
(52) U.S. Cl. ........................ 526/160; 526/943; 526/348; 526/904; 526/129
(58) Field of Search ................................. 526/160, 943, 526/348, 904, 129

(56) References Cited

FOREIGN PATENT DOCUMENTS

| | | | |
|---|---|---|---|
| EP | 0 989 139 A1 | 3/2000 | ........... C08F/10/00 |
| JP | 11-236414 | 8/1999 | ........... C08F/4/654 |
| KR | 2002-0007574 | 1/2002 | ........... C08K/3/34 |
| WO | WO 99/47598 | * 9/1999 | |
| WO | WO 00/69959 | * 11/2000 | |

* cited by examiner

Primary Examiner—Ling-Sui Choi
(74) Attorney, Agent, or Firm—Fish & Richardson P.C.

(57) ABSTRACT

Disclosed herein is a polyolefin nanocomposite prepared by polymerizing an olefin monomer in a catalyst system comprising (1) a supported catalyst consisting of a polymer, a silicate clay mineral, and a transition metal compound, and cocatalyst, an alkyl aluminoxane.

7 Claims, 1 Drawing Sheet

POLYOLEFIN NANO-COMPOSITE

TECHNICAL FIELD

The present invention relates to a polyolefin nanocomposite, more particularly, to a polyolefin nanocomposite prepared by polymerizing an olefin monomer in a catalyst system comprising (1) a supported catalyst consisting of a polymer, a silicate clay mineral, and a transition metal compound, and (2) a cocatalyst, an alkyl aluminoxane.

BACKGROUND ART

Typically, inorganic materials such as talc, mica, etc. are used as inorganic fillers to improve mechanical properties of polyolefin resins. Conventionally, the incorporation of such inorganic materials into polyolefin resins has been performed by mechanical means. However, the mechanical incorporation frequently results in poor dispersions in which particles of the inorganic materials form multi-layered aggregates because they are incompatible with polyolefin matrixes.

Various attempts have been made, so far, to disperse inorganic layered materials as nano-sized unit layers in polymer matrixes. For example, Journal of Appl. Polym. Scien., vol. 55, pp. 119–123(1995) discloses a polyamide exfoliation type nanocomposite prepared by using 12-aminolauric acid-treated silicate.

Further, Japanese Patent Publication No. Hei. 10-182892 discloses a method for dispersing a layered clay mineral in an olefin-based resinous matrix, the method comprising the steps of: organizing the layered clay mineral; broadening interlayer space of the organic layered clay mineral through the intercalation of a polyolefinic oligomer with functional groups thereinto; and mixing the resulting composite material with the olefin-based resinous matrix.

The radical polymerization of a monomer in the presence of a layered silicate clay mineral is another approach to obtain nanocomposite. However, the polymerization via catalytic mechanism of a Ziegler-Narta or metallocene catalyst cannot be accomplished in the presence of the layered silicate clay mineral due to hydrophilicity of the mineral.

SUMMARY OF THE INVENTION

Therefore, it is a feature of the present invention to provide a polyolefin nanocomposite improved in mechanical properties, by dispersing a layered inorganic material such as silicate as nano-sized unit layers in a polyolefin matrix through the intercalation and exfoliation thereof during the polymerization of the matrix.

One aspect of the present invention relates to a polyolefin nanocomposite prepared by polymerizing an olefin monomer in a catalyst system comprising (1) a supported catalyst consisting of a polymer, a silicate clay mineral, and a transition metal compound, and (2) an alkyl aluminoxane.

BRIEF DESCRIPTION OF DRAWINGS

The above object, other features and advantages of the present invention will become more apparent by describing the preferred embodiment thereof with reference to the accompanying drawings, in which.

DISCLOSURE OF THE INVENTION

Figure 1:
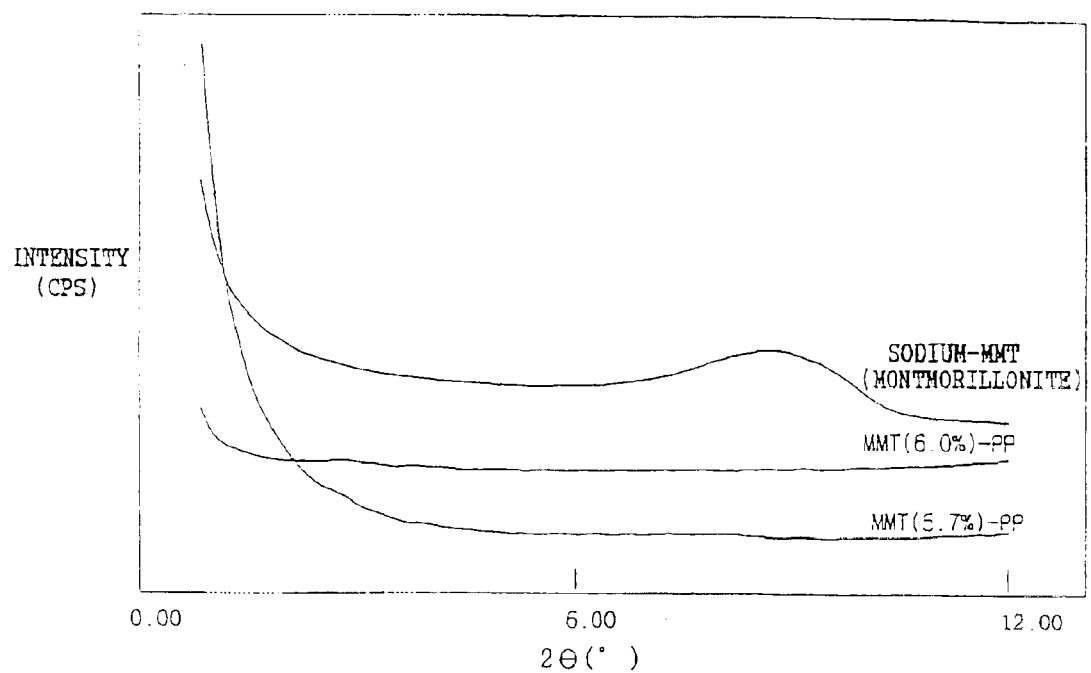
FIG. 1 is a pattern of wide-angle X-ray diffraction spectrum of a polypropylene-montmorillonite nanocomposite according to Example 1.

Polyolefin nanocomposites of the present invention are obtained from the polymerization of an olefin monomer, in a catalyst system comprising (1) a supported catalyst consisting of (at a polymer, (b) a silicate clay mineral, and (c) a transition metal compound, and (2) an alkyl aluminoxane.

The catalyst system used in the present invention comprises the following:

(a) Polymer

The polymer provides an insulating material or a medium between (b) a silicate clay mineral and (c) a transition metal compound. In order to obtain a high activity supported metallocene catalyst without deterioration of advantageous characteristic of metallocene catalyst, it is critical to completely insulate the metallocene catalyst to be supported from the poisonous surface of the support. That is, the polymer is used for insulating the metallocene catalyst from the poisonous surface of the support.

According to the present invention, the polymer has to meet the following requirements: first, it should not disturb the catalytic performance of the catalyst; second; it can chemically and physically interact with the catalyst and the surface of the support; and third, after loading of the, catalyst, it should be insoluble in any olefin monomers and solvents employed in the polymerization reaction.

Particularly, so as to meet the second requirement, the polymer should contain specific polar groups that can chemically and physically interact with the surface of the support. Such polar groups allow the polymer to be completely adsorbed onto the surface of the support, to form an insulating film on the surface of the support. Once the insulating film is formed, the polar groups function as media or substituents for use in loading of the homogeneous catalyst onto the support, to afford a stable complex with the metallocene catalyst. With the insulating film on its surface, intrinsic characteristic of the support is not important any more, and only shape and surface area thereof is taken into consideration.

Exemplary polymers containing such polar groups, without limitation, include acrylonitrile-based polymers such as polyacrylonitrile, poly(styrene-co-acrylonitrile), poly(acrylonitrile-block-styrene), acrylonitrile-butadiene-styrene resin, poly(acrylonitrile-co-butadiene), and poly(acrylonitrile-co-isoprene); hydroxyl group-containing polymers such as poly(vinyl alcohol); acryl- or acrylate-based polymers; polymers containing or modified with maleic anhydride; acetate-based polymers; polyether-based polymers; polyketone-based polymers; polyamide-based polymers; polyurethane-based polymers; and mixtures thereof.

Preferably, poly(styrene-co-acrylonitrile) ("SAN") is used, whose PDI (polymerization degree index) is over 5 and ecrylonitrile content is 0.1–100 wt %, preferably 2–50 wt %.

The polymer content of the supported catalyst is not specifically limited, but is preferably over 0.001 wt %.

(b) Silicate Clay Mineral

The layered silicate clay mineral used in the present invention is composed of stratiform nano-sized unit particles. As the layered silicate clay mineral, one or more selected from the group consisting of the following can be used: smectite-based layered clay minerals such as montmorillonite, hectorite, saponite, nontronite, beidellite, and laponite; vermiculite; halloysite; sauconite; magadite; medmontite; and kenyte.

According to the present invention, the layered silicate clay mineral is treated with component (a), the polymer containing polar groups capable of chemically and physically interacting therewith.

The layered silicate clay mineral is dispersed uniformly in a polyolefin matrix through intercalation and exfoliation thereof during polymerization of olefin, to form thin membranes of the mineral.

Content of component (b), the silicate clay mineral in the supported catalyst is not specifically limited, but is preferably over 70 wt %.

(c) Transition Metal Compound

Transition metal compound used as a homogeneous catalyst in the present invention is an organic metal compound represented by the formula (1) or (2):

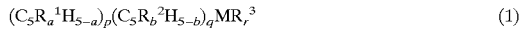

$$(C_5R_a^1H_{5-a})_p(C_5R_b^2H_{5-b})_qMR_r^3 \quad (1)$$

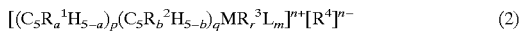

$$[(C_5R_a^1H_{5-a})_p(C_5R_b^2H_{5-b})_qMR_r^3L_m]^{n+}[R^4]^{n-} \quad (2)$$

in the above formulas (1) and (2), each of $R^1$ and $R^2$, independently, is $C_{1-20}$ alkyl, alkoxy, aryl, alkylaryl, arylalkyl, aryloxy, alkylene or alkyliden group, silyl group, silylene group, amino group, phospinyl group, or cyclopentadienyl group, indenyl group, fluorenyl group or derivatives thereof, wherein any of the hydrocarbon groups can be substituted with halogen atom, phosphorous functional group, nitrogenous functional group or silicon-containing functional group; $R^1$ and $R^2$ can be connected to each other to form a ring; and, where multiple $R^1$'s and $R^2$'s exist, the respective $R^1$'s and $R^2$' s can be connected to each other to form rings;

$R^3$ is hydrogen atom, halogen atom, $C_{1-20}$ alkyl, alkoxy, aryl, alkylaryl, arylalkyl, aryloxy or thioalkoxy group, silyl group, or amide group, wherein any of the hydrocarbon groups can be substituted with halogen atom; and $R^3$ can be connected to either $R^1$ or $R^3$ to form a ring;

M is a group III, IV, V or VI metal atom;

L Is an electrically neutral ligand compound;

$[R^4]^{n-}$ is an anion neutralizing a cation;

m is an integer from 0 to 3;

each of a and b, independently, is an integer from 0 to 5;

each of p, q and r, independently, is an integer from 0 to 3, provided that in the above formula (1), p+q+r is equal to V (wherein, V is valence of M), and in the above formula (2), p+q+r is equal to V–n; and n is an integer from 0 to V (wherein, V is valence of M).

Specific examples of $R^1$ and $R^2$ include $C_{1-20}$ alkyl groups such as methyl group, ethyl group, propyl group, butyl group, isoamyl group, isobutyl group, octyl group, and 2-ethylhexyl group; $C_{1-20}$ alkoxy groups such as methoxy group, ethoxy group, propoxy group, butoxy group, amyloxy group, hexyloxy group, and 2-ehtylhexyloxy grouop; $C_{6-20}$ aryl groups; $C_{7-20}$ alkylaryl groups; $C_{7-20}$ arylalkyl groups; $C_{6-20}$ aryloxy groups; $C_{1-20}$ alkylene groups such as methylene group, and ethylene group; $C_{1-20}$ alkylidene groups such as ethylidene group, propylidene group, isopropylidene group, phenylmethylidene group, and diphenylmethylidene group; silyl groups such as trimethylsilyl group, triethylsilyl group, and triphenylsilyl group; silylene groups such as dimethylsilylene group, diethylsilylene group, diisopronylsilylene group, diphenylsilylene group, methylehtylsilylene group, and methylphenylsilylene group; amino groups; phospinyl groups; and cyclopentadienyl groups, indenyl groups, fluorenyl groups and derivatives thereof.

In the above formulas (1) and (2), $C_5R_a^1H_{5-a}$ and $C_5R_b^2H_{5-b}$, preferably, form cyclopentadienyl derivatives, which can be exemplified by $C_5H_4(CH_2)_nO$—($1 \leq n \leq 5$), $C_5Me_4(CH_2)_nO$—($1 \leq n \leq 5$), $C_5H_4(MeSi)(t-Bu)N$—, and $C_5H_4(Me_4(Me_2Si)(t-Bu)N$— wherein, Me and Bu represent methyl and butyl, respectively).

In the above formulas (1) and (2), M is a metal atom belonging to any of groups III to VI in periodic table. Preferably, a group IV metal atom such as titanium, zirconium and hafnium is used solely or in combination with the other metal atoms.

In the above formulas (1) and (2), L represents an electrically neutral ligand, which can be exemplified by ethers such as dietyhylether, tetrahydrofuran, and dioxin; nitriles such as acetonitrile; amides such as dimethylformamide; phospines such as trimethylphospine; and amines such as triethylamine, while tetrahydrofuran, trimetyhlphospine and trimethylamine are particularly preferred.

$[R^4]^{n-}$ represents one or more anions capable of neutralizing a cation. Exemplary $R^4$ includes tetrapheyl borate, tetra(p-toryl)borate, carbadodecaborate, dicarbaundecaborate, tetrakis(pentanefluorophenyl)borate, tetrafluoroborate, and hexafluorophosphate.

While content of component (c), the transition metal compound in the supported catalyst is not specifically limited, 0.001–5 mmol of the transition metal compound is preferably used per 1 g of component (b), the silicate clay mineral.

In the preparation of a polyolefin nanocomposite according to the present invention, the supported catalyst is used in conjunction with component (2), the cocatalyst. As the cocatalyst, an alkyl aluminoxane described below as component (d) is used solely, or optionally, together with additional component (e), an alkyl aluminum compound.

(d) Alkyl Aluminoxane

According to the present invention, an alkyl aluminoxane is employed as a cocatalyst in the preparation of a polyolefin nanocomposite of the present invention.

The alkyl aluminoxane, which is obtained from a reaction of an alkyl aluminum and water as a condensing agent, can be represented by the formula (3)

$$\left[\begin{array}{c} Al-O \\ | \\ R^5 \end{array}\right]_j \quad (3)$$

wherein, $R^5$ is $C_{1-8}$ alkyl group; and j is an integer from 2 to 50.

The skeleton of component (d), the alkyl aluminoxane of formula (3) can be either linear or cyclic.

While the alkyl aluminoxane is not necessarily used in a specified amount, it is preferred to use 0.1–100 mol of the alkyl aluminoxane per 1 g of component (b), the silicate clay mineral. Further, molar ratio of aluminum in the alkyl, aluminoxane against transition metal in component (c), the transition metal compound, is adjusted to fall in the range of 1:1 to 1:100,000, preferably 1:10 to 1:10,000.

(e) Alkyl Aluminum

In the preparation of a polyolefin nanocomposite according to the present invention, an alkyl aluminum represented by the formula (4) can be also used as a cocatalyst in addition to the alkyl aluminoxane:

$$AlR_3^6 \quad (4)$$

wherein, $R^6$ is $C_{1-8}$ alkyl group.

In a metallocene catalyst system according to the present invention, component (e) is, if necessary, optionally used.

Using the component materials enumerated above, a supported catalyst is prepared through physical adsorption or chemical bonding according to any of the following schemes:

(a)/(b)/(c)+(d)           (1)

(a)/(b)/{(c)+(d)}          (2)

(a)/(b)/(d)+(c)           (3)

(a)/(b)/(c)+(a)/(b)/(d)        (4)

(a)/(b)/(c)/(d)           (5)

wherein, "/" represents addition sequence of each component; "+" represents that materials before and behind it are contacted with each other in different phases; and "{ }" represents that components (c) and (d) are mixed together prior to being simultaneously added to the other components. Particularly, scheme (2) is preferred, considering that active cations exist on the surface of the support in a similar manner to a homogeneous system, to exert high activity. Solvent used in the preparation of the supported catalyst is not specifically limited, but aliphatic and aromatic hydrocarbon solvents are preferred. Reaction temperature for preparing the supported catalyst is maintained between −20° C. and boiling point of the solvent used, preferably between room temperature and boiling point of the solvent used.

As olefin monomers used in the preparation of a polyolefin nanocomposite according to the present invention, one or more selected from the group consisting of the following are preferred: ethylene, propylene, 1-pentene, 1-butene, 4-methyl-1-pentene, 1-hexene, 1-octene, 1-decene, ethylidene, norbonene, 1,4-hexadiene, 1,5-hexadiene, 3-methyl-1-butene, 3-methyl-1-pentene, dicyclopentadiene, ethylene-propylene-diene, and vinylcycloalkane. These monomers can be made into desired polyolefin nanocomposite through homopolymerization, as well as through random- or block- copolymerization.

Using the supported catalyst and the olefin monomer, the polymerization reaction is conducted with or without using an inert hydrocarbon solvent such as butane, pentane, hexane, heptane, toluene, and cyclohexane. Temperature of the polymerization reaction is maintained between −50° C. and 250° C., while pressure is not specifically limited.

Polyolefin nanocomposites of the present invention can further comprises various additives such as antioxidant, nucleating agent, lubricant, colorant, release agent, antistatic agent, and pigment. The kind and amount of additives to be used depend on various factors including the desired usage of the polyolefin nanocomposites.

A more detailed description of the present invention will be given in conjunction with the following examples. The following examples are for illustration purposes only and in no way limit the scope of this invention.

Example 1

<Preparation of a Sodium Montmorillonite-Derived Support for Catalyst>

To a dried 250 ml flask equipped with a magnetic stirring bar was added 20 g of sodium montmorillonite (Cloisite, without chemical modification; Southern Clay Products, Inc., Texas), and then heated at. 400° C. for 6 hrs under vacuum condition. After cooling the reaction to room temperature, 11.0 g of SAN[poly(styrene-co-acrylonitrile)] (HF-9690, acrylonitrile content: 23 wt %, MW: 90,000; Cheil Industries, Inc.) and 100 ml of toluene (distilled in the presence of sodium-benzophenone) were added thereto under a nitrogen atmosphere. The reaction mixture was allowed to stir at room temperature for 2 hrs so as to completely dissolve the SAN polymer, and then toluene was removed therefrom, followed by vacuum drying to afford pale gray powder. Subsequently, 2 mmol of MAO (methyl aluminoxane) in 100 ml of toluene was added to the powder at room temperature. The resulting slurry was allowed to stir at room temperature for 30 min, and then toluene was removed therefrom, followed by vacuum drying to afford a montmorillonite-derived catalyst support as pale gray powder.

<Preparation of a Supported Catalyst>

To a 25 ml glass bottle in a dry box was added 3 g of the montmorillonite-derived catalyst support obtained from the above, followed by addition of 2.4 $\mu$mol of rac-EBIZrCl$_2$ (racemic ethylenebisindenylzirconium dichloride) in 10 ml of toluene (distilled in the presence of sodium-benzophenone) by means of a syringe. The resulting slurry was allowed to stand at room temperature for 1 hr to afford a supported catalyst slurry.

<Preparation of a Polyolefin Nanocomposite>

To a 2 L autoclave high-pressure reactor were added 6.2 ml (12 mmol) of a 1.95M methyl aluminoxane solution and the supported catalyst slurry obtained from the above. At this time, molar ratio of [MAO]/[Zr] was 5,000. Thereafter, 1,200 ml of liquid propylene as an olefin monomer was added to the reactor, and then polymerized at 50° C. for 1 hr. The resulting polymeric product was dried under vacuum condition to afford 53 g of powdery polymeric composite. Activity of the composite was 22.1 kg/mol-Zr-hr, and montmorillonite clay mineral content was 5.7 wt %.

A specimen of the composite, thus prepared was subjected to X-ray diffractometry so as to assess dispersibility of clay mineral particles based on interlayer distance of the layered clay mineral. The X-ray diffractometry was performed by means of RINT-2000 (Rigakku Co., Japan) emitting CuKa (a=0.15 nanometers ray, which operated at 40 kV-50 mA. FIG. 1 shows a pattern of wide-angle X-ray diffraction spectrum of the polypropylene-montmorillonite nanocomposite prepared in the present Example. As apparent from FIG. 1, the disappearance of a peak corresponding to crystal of clay mineral in the specimen of the polypropylene-clay mineral nanocomposite evidently indicates that unit particles of the clay mineral is completely exfoliated and dispersed in the polypropylene matrix.

The polymer resulted from the polymerization reaction according to the present Example was confirmed as an isotactic polypropylene with melting point of 142° C. through $C^{13}$ NMR and DSC.

50 g of the powdery polymeric composite was pressed into a 150 mm×150 mm×3 mm sheet on a hot plate at 170° C. and then sliced, followed by analyses for flexural modulus, notch izod impact strength, and heat deflection temperature. The results are set forth in the following Table 1.

Example 2

The procedure of Example 2 was conducted according to the same manner as in the above Example 1, except that a reduced amount of the cocatalyst (methyl aluminoxane) was used upon preparing the montmorillonite-derived catalyst support.

Molar ratio of [MAO]/[Zr] was 3,000, activity of the composite was 20.8 kg/mmol-Zr-hr, and montmorillonite clay mineral content was 6.0 wt %.

Comparative Example 1

To the same reactor as used in the above Example 1, 12.8 ml (25 mmol) of a 1.95M methyl aluminoxane solution and 5.0 μmol of a homogeneous catalyst, rac-EBIZrCl₂(racemic ethylenebisindenylzirconium dichloride) were added by means of a syringe. Thereafter, 1,200 ml of liquid propylene was added to the reactor and allowed to stir at 660 rpm at 50° C. for 1 hr. Resultantly, a polymer was produced concomitant with the fouling of wall and impeller of the reactor. The polymer was dried under vacuum condition to afford 65 g of powdery polymer. Activity of the polymer was 13 kg/mmol-Zr-hr.

TABLE 1

| | Example 1 | Example 2 | Comparative Example 1 |
|---|---|---|---|
| rac-EBIZrCl₂(10⁻⁶ mol) | 2.4 | 2.4 | 5.0 |
| MAO(10⁻³ mol) | 12.0 | 7.2 | 25.0 |
| Montmorillonite-derived catalyst support content(g) | 3 | 3 | 0 |
| [MAO]/[Zr] | 5,000 | 3,000 | 5,000 |
| Activity (kg/mmol-Zr-hr) | 22.1 | 20.8 | 13.0 |
| Montmorillonite abundance<sup>a</sup> | 5.7 | 6.0 | 0 |
| Flexural modulus (kgf/cm²) | 17,540 | 17,740 | 9,800 |
| Notch izod impact strength (kgcm/cm) | 1.0 | 1.1 | 0.9 |

<sup>a</sup>[montmorillonite-derived catalyst support content(g)] ÷ [total yield(g)]

[Method for measuring the physical properties]

Flexural modulus: ASTM D-790

Notch izod impact strength: ASTM D-256

Heat deflection temperature: ASTM D-648(load: 4.6 kg/cm²).

As shown in Table 1, the montmorillonite-supported catalyst according to Example 1 was round to be advantageous over the homogeneous catalyst used in Comparative Example 1 in light of production yield of polymer. Moreover, the montmorillonite-supported catalysts according to the above Examples caused the fouling of the reactor as little as ignorable, whereas considerable fouling of the reactor occurred in the Comparative Example using the homogeneous catalyst. Furthermore, as apparent from the X-ray diffraction spectrum, in the polypropylene nanocomposites obtained from polymerization reactions using the supported catalysts of the present invention, unit particulate layers of montmorillonite are uniformly dispersed in the polypropylene matrixes, whereby the polypropylene nanocomposites of the present invention retain superior flexural modulus to that of a polypropylene lacking montmorillonite with maintaining equivalent impact strength.

INDUSTRIAL APPLICABILITY

As stated above, the polyolefin nanocomposite of the present invention is obtained from a polymerization reaction using a supported catalyst on nano clay mineral particles modified with a polar polymer such as poly(styrene-co-acrylonitrile) ("SAN"), without fouling the reactor. The clay mineral particles are uniformly dispersed in the polyolefin nanocomposite of the present invention to form a large number of nano-sized unit particulate layers, which allows the polyolefin nanocomposite excellent mechanical properties including rigidity and impact-resistance. Furthermore, the polyolefin nanocomposite of the present invention were improved in heat-resistance, incombustibility, transparency, gas and liquid impermeability, and so on. By virtue of these advantages, the polyolefin nanocomposite of the present invention can be molded into slim and light products, which will find numerous applications in various industries, including automobiles, industrial materials, and electrical and electronic appliances.

What is claimed is:

1. A polyolefin nanocomposite prepared by polymerizing an olefin monomer in a catalyst system, the catalyst system comprising (1) a supported catalyst consisting of a polymer, a silicate clay mineral, and a transition metal compound, and (2) an alkyl aluminoxane, wherein the polymer is one or more selected from the group consisting of acrylonitrile-based polymers, hydroxyl group-containing polymers, acryl-or acrylate-based polymers, maleic anhydride-containing or maleic anhydride-modified polymers, acetate-based polymers, polyether-based polymers, polyketone-based polymers, polyamide-based polymers, and polyurethane-based polymers.

2. The polyolefin nanocomposite according to claim 1, wherein the olefin monomer is one or more selected from the group consisting of ethylene, propylene, 1-pentene, 1-butene,4-methyl-1-pentene, 1-hexene, 1-octene, 1-decene, ethylidene, norbonene, 1,4-hexadiene, 1,5-hexadiene, 3-methyl-1-butene, 3-methyl-1-pentene, dicyclopentadiene, ethylene-propylene-diene, vinylcycloalkane.

3. The polyolefin nanocomposite according to claim 1, wherein the silicate clay mineral is one or more selected from the group consisting of montmorillonite, hectorite, saponite, nontronite, beidellite, laponite, vermiculite, halloysite, sauconite, magadite, medmontite, and kenyte.

4. The polyolefin nanocomposite according to claim 1, wherein the transition metal compound is represented by the formula (1) or (2):

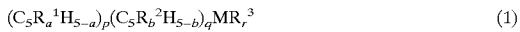

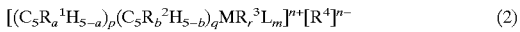

in the above formulas (1) and (2), each of $R^1$ and $R^2$, independently, is $C_{1-20}$ alkyl, alkoxy, aryl, alkylaryl, arylalkyl, aryloxy, alkylene or alkyliden group, silyl group, silylene group, ammo group, phospinyl group, or cyclopentadienyl group, indenyl group, fluorenyl group or derivatives thereof, wherein any of the hydrocarbon groups can be substituted with halogen atom, phosphorous functional group, nitrogenous functional group or silicon-containing functional group; $R^1$ and $R^2$ can be connected to each other to form a ring; and, where multiple $R^1$'s and $R^2$'s exist, the respective $R^1$'s and $R^2$'s can be connected to each other to form rings;

$R^3$ is hydrogen atom, halogen atom, $C_{1-20}$ alkyl, alkoxy, aryl, alkylaryl, arylalkyl, aryloxy or thioalkoxy group, silyl group, or amide group, wherein any of the hydrocarbon groups can be substituted with halogen atom; and $R^3$ can be connected to either $R^1$ or $R^3$ to form a ring, M is a group III, IV, Y or VI metal atom;

L is an electrically neutral ligand compound;

$[R^4]^{n-}$ is an anion neutralizing a cation; m is an integer from 0 to 3;

each of a and b, independently, is an integer from 0 to 5;

each of p, q and r, independently, is an integer from 0 to 3, provided that in the above formula (1), p+q+r is equal to V (wherein, V is valence of M), and in the above formula (2), p+q+r is equal to V−n; and n is an integer from 0 to V (wherein, V is valence of M).

5. The polyolefin nanocomposite according to claim 1, wherein the alkyl aluminoxane is represented by the formula (3):

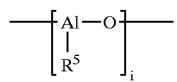
(3)
wherein, $R^5$ is $C_{1-8}$ alkyl group; and j is an integer from 2 to 50.
6. The polyolefin nanocomposite according to claim 1, wherein the catalyst system further comprises an alkyl aluminum.
7. The polyolefin nanocomposite according to claim 6, wherein the alkyl aluminum is represented by the formula (4):
$$AlR^6{}_3 \qquad (4)$$
wherein, $R^6$ is a $C_{1-8}$ alkyl group.
* * * * *